United States Patent
Davis et al.

(10) Patent No.: US 12,356,530 B1
(45) Date of Patent: Jul. 8, 2025

(54) METHOD OF REMOVING AN INSERT FROM A SUBSTRATE

(71) Applicant: General Electric Company, Schenectady, NY (US)

(72) Inventors: Zachary Davis, Melbourne, FL (US); Benjamin E. Nesbit, Oxford, MS (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/733,100

(22) Filed: Jun. 4, 2024

(51) Int. Cl.
*H05B 6/10* (2006.01)
*F01D 25/24* (2006.01)

(52) U.S. Cl.
CPC ............... *H05B 6/10* (2013.01); *F01D 25/24* (2013.01); *F05D 2230/70* (2013.01); *H05B 2206/022* (2013.01)

(58) Field of Classification Search
CPC ..... F01D 25/24; H05B 6/10; H05B 2206/022; F05D 2230/70
See application file for complete search history.

(56) References Cited

U.S. PATENT DOCUMENTS

| | | | | |
|---|---|---|---|---|
| 4,677,744 A | * | 7/1987 | Muller | H02K 15/03 29/729 |
| 5,025,542 A | * | 6/1991 | Jacks | B25B 27/026 29/263 |
| 5,317,793 A | * | 6/1994 | Boyd | F16C 33/08 29/281.1 |
| 6,840,555 B1 | * | 1/2005 | Thompson | E02D 29/1445 294/209 |
| 7,087,870 B1 | * | 8/2006 | Fishman | H02M 7/523 219/661 |
| 7,818,860 B2 | * | 10/2010 | Hume | B25B 27/023 29/259 |
| 9,782,877 B2 | * | 10/2017 | Marquis | B25B 31/00 |
| 11,105,342 B2 | * | 8/2021 | Williamson | F04D 29/563 |
| 11,123,848 B2 | * | 9/2021 | Wojciechowski | B25B 27/026 |
| 12,036,642 B2 | * | 7/2024 | Mueller | B23P 19/025 |
| 2021/0220979 A1 | * | 7/2021 | Osborne | B25B 27/28 |

FOREIGN PATENT DOCUMENTS

EP 2236005 B1 * 3/2017 ............... H05B 6/14

* cited by examiner

*Primary Examiner* — Bayan Salone
(74) *Attorney, Agent, or Firm* — Venable LLP; Michele V. Frank

(57) ABSTRACT

A method of removing an insert from a substrate, the method including heating the insert using induction, melting at least partially or softening an adhesive material between the insert and the substrate, applying a force to break an adhesive bond between the insert and the substrate, and removing the insert without damaging the substrate.

20 Claims, 4 Drawing Sheets

METHOD OF REMOVING AN INSERT FROM A SUBSTRATE

TECHNICAL FIELD

The present disclosure relates generally to bushing or insert pullers and, in particular, to a method of removing an insert from a substrate.

BACKGROUND

Turbine engines generally include a fan and a turbo-engine arranged in flow communication with one another. The turbo-engine includes one or more turbines and one or more compressors. The fan, turbines and compressors are provided within casing structures. A laminate structure is bonded or attached to the casing structure using inserts. In addition, generally, aircraft airframes may also rely on sandwich panel components that may use inserts as attachments. Inserts are often removed if damaged or worn. It is desirable to remove the inserts without damaging the laminate structure.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
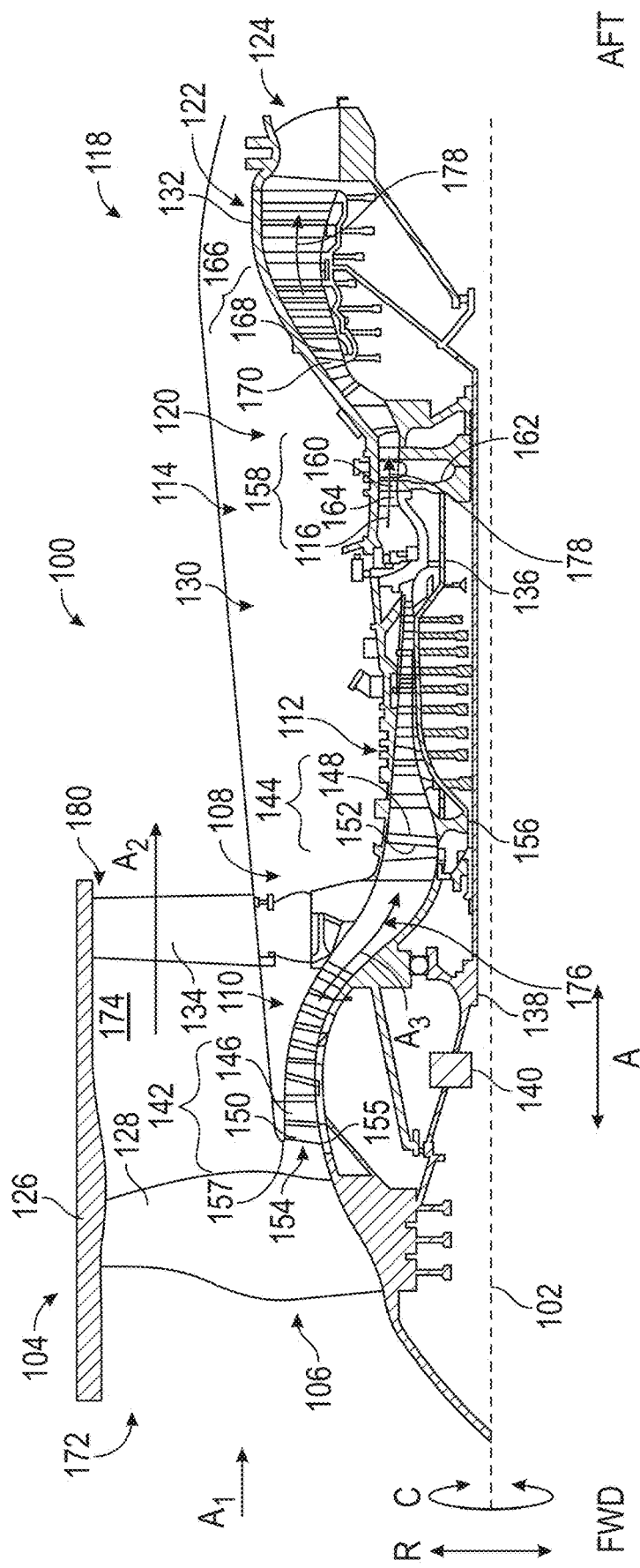
FIG. 1 illustrates a schematic, cross-sectional view of a ducted, indirect-drive gas turbine engine, taken along a longitudinal centerline axis of the engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein. The terms include integral and unitary configurations (e.g., blisk rotor blade systems).

The singular forms "a," "an," and "the" include plural references unless the context clearly dictates otherwise.

As used herein, the terms "axial" and "axially" refer to directions and orientations that extend substantially parallel to a longitudinal centerline axis of the turbine engine. Moreover, the terms "radial" and "radially" refer to directions and orientations that extend substantially perpendicular to the longitudinal centerline axis of the turbine engine. In addition, as used herein, the terms "circumferential" and "circumferentially" refer to directions and orientations that extend arcuately about the longitudinal centerline axis of the turbine engine.

Inserts that are thermally conductive are adhesively bonded into or onto a substrate such as a composite laminate or a sandwich panel to attach the composite laminate or the sandwich panel to a frame (e.g., a fan casing). In order to remove damaged or worn inserts, it may be desirable to remove the inserts without damaging the composite laminate or the sandwich panel. Currently, there is no effective method to remove metallic inserts, including titanium, aluminum, or stainless-steel bushings and inserts, from laminate structures other than mechanically milling the insert away. However, milling the insert away not only destroys the insert but also may lead to damaging or compromising the structural integrity of the laminate, thus losing valuable components. An insert induction remover device allows extraction of thermally conductive inserts for replacement or repair. The insert induction remover device can be used as an induction bushing puller to break bonds of polymer adhesive from the composite laminate or sandwich panel without exceeding a glass transition temperature of the underlying laminate and without mechanically or thermally damaging the laminate. The insert induction remover device can be used to replace or to repair multiple types of thermally conductive adhesively bonded inserts.

FIG. 1 shows a schematic, cross-sectional view of a turbine engine 100, taken along a longitudinal centerline axis 102 of the turbine engine 100, according to an embodiment of the present disclosure. The turbine engine 100 includes, in a downstream serial flow relationship, a fan section 104 including a fan assembly 106, a compressor section 108 including a booster or a low-pressure (LP) compressor 110 and a high-pressure (HP) compressor 112, a combustion section 114 including a combustor 116, a turbine section 118 including a high-pressure (HP) turbine 120, a low-pressure (LP) turbine 122, and an exhaust nozzle 124. As shown in FIG. 1, the turbine engine 100 defines an axial direction A, a radial direction R, and a circumferential direction C. As shown and described herein, the turbine engine 100 can be a ducted, indirect-drive, turbine engine 100.

The fan section 104 includes a fan casing 126, which is secured to a nacelle (omitted for clarity) surrounding the fan assembly 106. The fan assembly 106 includes a plurality of fan blades 128 disposed radially about the longitudinal centerline axis 102. The HP compressor 112, the combustor 116, and the HP turbine 120 form a turbo-engine 130 of the turbine engine 100, which generates combustion gases. The turbo-engine 130 is surrounded by a turbo-engine casing 132 that is coupled to the fan casing 126. The fan casing 126 is supported relative to the turbomachine by circumferentially spaced outlet guide vanes 134.

A high-speed shaft 136, also referred to herein as a high-pressure shaft 136, is disposed coaxially about the longitudinal centerline axis 102 of the turbine engine 100 and drivingly connects the HP turbine 120 to the HP compressor 112. A low-speed shaft 138, also referred to herein as a low-pressure shaft 138, which is disposed coaxially about the longitudinal centerline axis 102 of the turbine engine 100 and within the larger diameter, annular, high-speed shaft 136, drivingly connects the LP turbine 122 to the LP compressor 110 and the fan assembly 106 (either directly or indirectly through a gearbox assembly 140). The high-speed shaft 136 and the low-speed shaft 138 are rotatable about the longitudinal centerline axis 102.

The LP compressor 110 and the HP compressor 112, respectively, include a respective plurality of compressor stages 142 and 144, in which a respective set of rotor compressor blades 146 and 148 rotate relative to a respective set of stator compressor vanes 150 and 152 to compress or to pressurize gas entering through an inlet 154 defined by an inner casing 155 and an outer casing 157 of the LP compressor 110. Each compressor stage 144 of the HP compressor 112 includes multiple rotor compressor blades 148 provided on a rotor disk 156 (or the blades and the disk are integrated together, referred to as a blisk), also referred to herein as rotor compressor blades 148. Each rotor compressor blade 148 extends radially outwardly relative to the longitudinal centerline axis 102, from a blade platform to a blade tip. Stator compressor vanes 152 are positioned upstream and downstream of, and adjacent to, rotor compressor blades 148. The rotor disk 156 for a stage of rotor compressor blades 148 is mounted to the high-speed shaft 136. The compressor stage 144 of the HP compressor 112 may refer to a single disk of rotor compressor blades 148 or may refer to both the single disk of rotor compressor blades 148 and an adjacent single disk of stator compressor vanes 152. Either meaning can apply within the context of this disclosure without loss of clarity. The same description applies to each compressor stage 142 of the LP compressor 110 (e.g., each compressor stage 142 of the LP compressor 110 includes multiple compressor blades 146, also referred to as compressor blades 146, and stator compressor vanes 150).

The HP turbine 120 has one or two turbine stages 158. In a single turbine stage 158, turbine blades 160 are provided on a rotor disk 162. Each turbine blade 160 extends radially outwardly relative to the longitudinal centerline axis 102, from a blade platform to a blade tip. The HP turbine 120 can also include stator turbine vanes 164, also referred to as stator turbine nozzles. The HP turbine 120 may have an upstream nozzle adjacent an exit of the combustor 116 and a downstream nozzle aft of the rotor (e.g., turbine blades 160) or the HP turbine 120 may have a nozzle upstream of the rotor blades (e.g., turbine blades 160) or downstream of the rotor blades.

Air exiting the HP turbine 120 enters the LP turbine 122, which has a plurality of turbine stages 166 of rotor blades 168. The LP turbine 122 can have three, four, five, or six stages. In a single LP turbine stage 166 (containing a plurality of rotor blades 168 coupled to the low-speed shaft 138), the rotor blades 168 are provided on a rotor disk (connected to the low-speed shaft 138) and extend radially outwardly relative to the longitudinal centerline axis 102, from a blade platform to a blade tip. The LP turbine 122 can also include stator turbine vanes 170, also referred to as a stator turbine nozzle. The LP turbine 122 may have both an upstream nozzle and a downstream nozzle aft of a turbine stage 166, followed by the exhaust nozzle 124.

During operation of the turbine engine 100, a volume of air A1 enters the turbine engine 100 through an inlet 172 of the fan casing 126. As the volume of air A1 passes through the fan section 104 and across the fan blades 128, a first portion of air A2 of the air A1 is directed or routed into a bypass air flow passage 174 and a second portion of air A3 of the air A1 is directed or routed into the inlet 154 at an upstream section of air flow passage 176 of the turbo-engine 130. The ratio between the first portion of air A2 and the second portion of air A3 is commonly known as a bypass ratio. The pressure of the second portion of air A3 is then increased as it is routed through the HP compressor 112 and into the combustion section 114, where the highly pressurized air is mixed with fuel and burned to provide combustion gases 178.

The combustion gases 178 are routed into the HP turbine 120 and expanded through the HP turbine 120 where a portion of thermal and/or kinetic energy from the combustion gases 178 is extracted via sequential stages of the HP turbine 120 stator turbine vanes 164 and turbine blades 160, which are coupled to the high-speed shaft 136, thus causing the high-speed shaft 136 to rotate, thereby supporting operation of the HP compressor 112. The combustion gases 178 are then routed into the LP turbine 122 and expanded through the LP turbine 122. Here, a second portion of thermal and kinetic energy is extracted from the combustion gases 178 via sequential stages of the LP turbine 122 stator turbine vanes 170 and the LP turbine 122 rotor blades 168 that are coupled to the low-speed shaft 138, thus, causing the low-speed shaft 138 to rotate. The rotation of the low-speed shaft 138 thereby supports operation of the LP compressor 110 and rotation of the fan assembly 106 (via the gearbox assembly 140, when present).

The combustion gases 178 are subsequently routed through the exhaust nozzle 124 to provide propulsive thrust. Simultaneously, the pressure of the first portion of air A2 is substantially increased as the first portion of air A2 is routed through the bypass air flow passage 174 before being exhausted from a fan nozzle exhaust 180, also providing propulsive thrust.

The turbine engine 100 is by way of example only. In other embodiments, the gas turbine engine may have any other suitable configuration, including, for example, any other suitable number or configurations of shafts or spools, fan blades, turbines, compressors, or a combination thereof. The gearbox assembly 140 may have any suitable configuration, including, for example, a star gear configuration, a planet gear configuration, a single-stage, a multi-stage, epicyclic, non-epicyclic, etc., as detailed further below. The gearbox assembly 140 may have a gear ratio in a range of 3:1 to 4:1, 3:5 to 4:1, 3.25:1 to 3.5:1, or 4:1 to 5:1. The fan assembly 106 may be any suitable fixed-pitched assembly or variable-pitched assembly. The turbine engine 100 may include additional components not shown in FIG. 1, such as additional rotor blades, stator vanes, etc. The fan assembly 106 may be configured in any other suitable manner (e.g., as a fixed pitch fan) and further may be supported using any other suitable fan frame configuration. Aspects of the present disclosure may be incorporated into any other suitable turbine engine, including, but not limited to, turbofan engines, propfan engines, turbojet engines, turboprop, and turboshaft engines, aviation-based turbine engines, marine-based turbine engines, land-based turbine engines, industrial turbine engines, power generation turbine engines, etc.

As noted, the high-pressure compressors and turbines and the low-pressure compressors and turbines include one or more stages each having two types of blades: stator blades and rotor blades. The blades, whether stator or rotor, are arranged in a circumferential manner about the longitudinal centerline axis 102. That is, each stage of the compressor and the turbine is associated with a ring or a circumferential row of stator blades and a ring or a circumferential row of rotor blades. The rotor blades or the stator blades are axisymmetric about the longitudinal centerline axis 102.

Inserts that are thermally conductive, also referred to herein as "thermally conductive inserts," are adhesively bonded into or onto a substrate such as a laminate structure (e.g., a composite laminate structure or a sandwich panel structure). The inserts are used to attach the laminate structure to a frame (e.g., the fan casing 126 and/or the outer casing 157 of the LP compressor 110 shown in FIG. 1). In order to remove damaged or worn inserts, it may be desirable to remove the inserts without damaging the laminate structure. Currently, there is no effective method to remove the inserts (e.g., metallic inserts), such as titanium, aluminum, or stainless-steel bushings and inserts, from the laminate structures other than mechanically milling the insert away. However, milling the insert away not only destroys the inserts but also may lead to damaging or compromising the structural integrity of the laminate, thus, losing valuable components.

An insert induction remover device allows extraction of thermally conductive inserts for replacement or repair. The insert induction remover device breaks bonds of polymer adhesive from the laminate without exceeding a glass transition temperature of the laminate and without mechanically damaging the underlying laminate (e.g., delamination, splintering, removal of lamina, etc.). The insert induction remover device can be used to repair and to replace multiple types of thermally conductive adhesively bonded inserts.

Figure 2A:
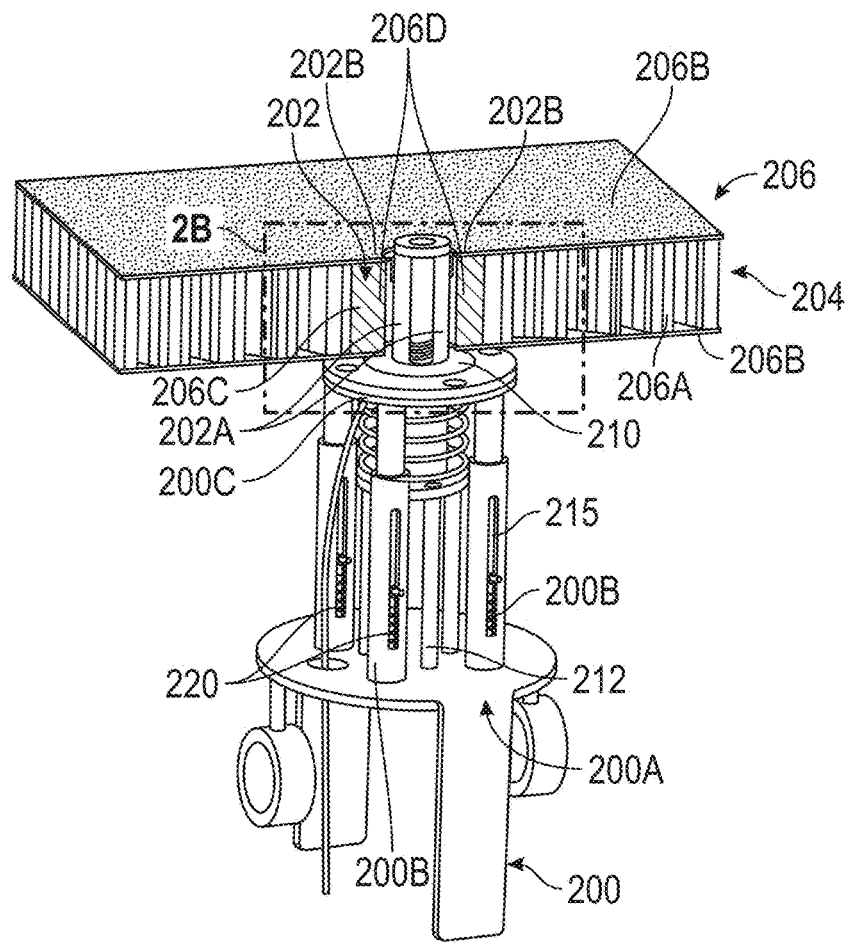
FIG. 2A is a perspective view of an insert induction remover device used to remove an insert from a substrate (e.g., a sandwich panel structure), according to an embodiment of the present disclosure.
Figure 2B:
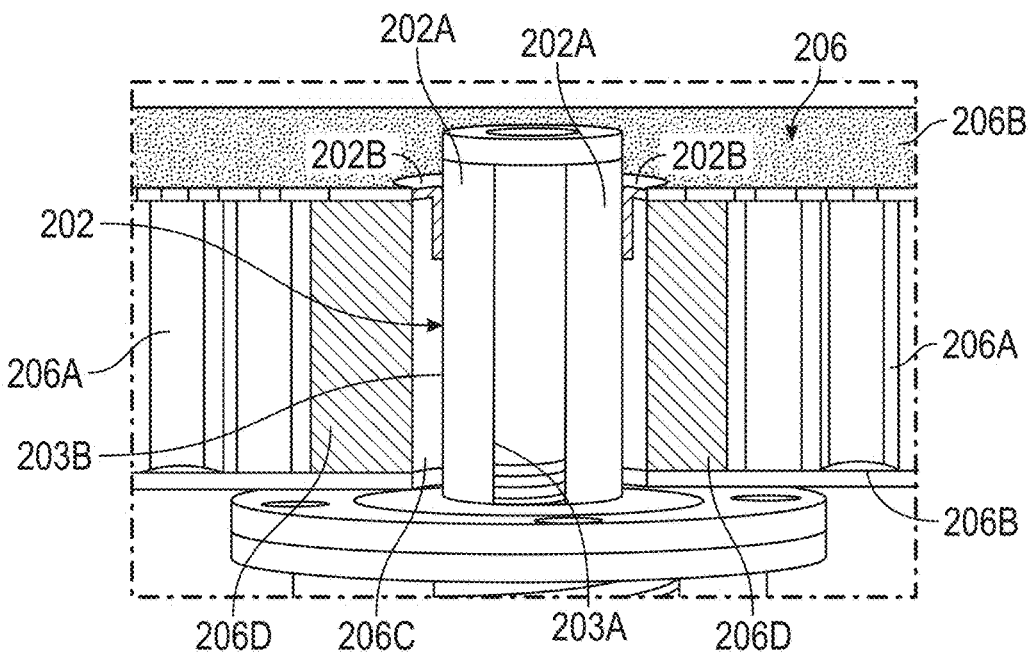
FIG. 2B is an enlarged cross-sectional, elevational view showing details of the insert within the substrate (e.g., the sandwich panel structure), according to an embodiment of the present disclosure.

FIG. 2A is a perspective view of an insert induction remover device 200 used to remove an insert 202 from a substrate 204, according to an embodiment of the present disclosure. FIG. 2B is an enlarged partial cross-sectional, elevational view showing details of the insert 202 within the substrate 204, according to an embodiment of the present disclosure. In an embodiment, as shown in FIG. 2A, the substrate 204 includes a laminate structure 206, such as a sandwich panel structure, having a honeycomb core 206A sandwiched between two laminates 206B. The honeycomb core 206A can be made from a first material including, but not limited to, an aramid fiber reinforced phenolic resin, polyethylene (PE), polypropylene (PP), aluminum, carbon fiber, and/or fiber glass. For example, the honeycomb core 206A can be made of NOMEX®, manufactured by DuPont Corporation. The laminates 206B can be made from one or more layers of a second material including, but not limited to, carbon fiber reinforced epoxy, carbon fiber, fiber glass, polyimide, and/or polyester. In an embodiment, the first material of the honeycomb core 206A can be different from the second material of the laminates 206B.

As shown in FIG. 2A and in FIG. 2B, the laminate structure 206 includes one or more holes 206C for receiving the insert 202. The one or more holes 206C may be defined by an end-core 206D. In an embodiment, the end-core 206D can be made from a third material (a potting material) including, but not limited to, a polymer such as epoxy, polyurethane, etc., to attach the insert 202 to the laminate structure 206. The end-core 206D may act as an adhesive to bond the insert 202 to the laminate structure 206 or as stabilization of the honeycomb cells near the cut edge. In one embodiment, the end-core 206D is formed after installing the insert 202 within the one or more holes 206C and then by injecting the material of the end-core 206D between the insert 202 and the laminate structure 206 within the one or more holes 206C. Injecting the material of the end-core 206D fills open cells of the laminate structure 206 within the one or more holes 206C. In another embodiment, the insert 202 is glued to an outer surface of the laminate 206B (e.g., the planar surface of the laminate) using an adhesive that is adapted for the material of the laminate 206B. In an embodiment, the end-core 206D is pre-cured before the attachment of the insert and defines a cylindrical sleeve for attaching the insert 202 to the laminate structure 206.

As shown in more detail in FIG. 2B, the insert 202 includes a bushing 202A and a plug 202B. The bushing 202A has an interior wall 203A and an exterior wall 203B defining a material thickness between the interior wall 203A and the exterior wall 203B. In an embodiment, the bushing 202A is made of metal that is conductive to heat (for example, stainless steel, aluminum, titanium, etc.). In an embodiment, the bushing 202A can be a threaded bushing. The threads can be provided within the interior wall 203A of the bushing 202A. The exterior wall 203B of the bushing 202A meets the end-core 206D. In another embodiment, the bushing 202A is not threaded, in which case, no threads are provided within the interior wall 203A of the bushing 202A. In an embodiment, the plug 202B is mounted to an end of the bushing 202A to seal the side opposite the side the insert 202 is installed from on the one or more holes 206C if the one or more holes 206C are through-holes after injecting the material of end-core 206D and forming the end-core 206D around the bushing 202A. In an embodiment, the plug 202B can be made of a plastic, metal, or a composite material. In an embodiment, the one or more holes 206C are not through the entire laminate structure 206 and the plug 202B is not used. In an embodiment, a fastener (not shown) may be inserted inside the bushing 202A of the insert 202 to mount the laminate structure 206 to a structure, such as, a frame.

In another embodiment, the bushing 202A (e.g., the bushing head) may be adhesively bonded to an outer surface of the laminate 206B (e.g., the planar surface of the laminate). In another embodiment, the bushing 202A may also not be adhesively bonded to the surface of the laminate 206B. In an embodiment, the bushing 202A may or may not interface with an adhesive that locks the bushing 202A to the honeycomb core 206A.

Figure 3:
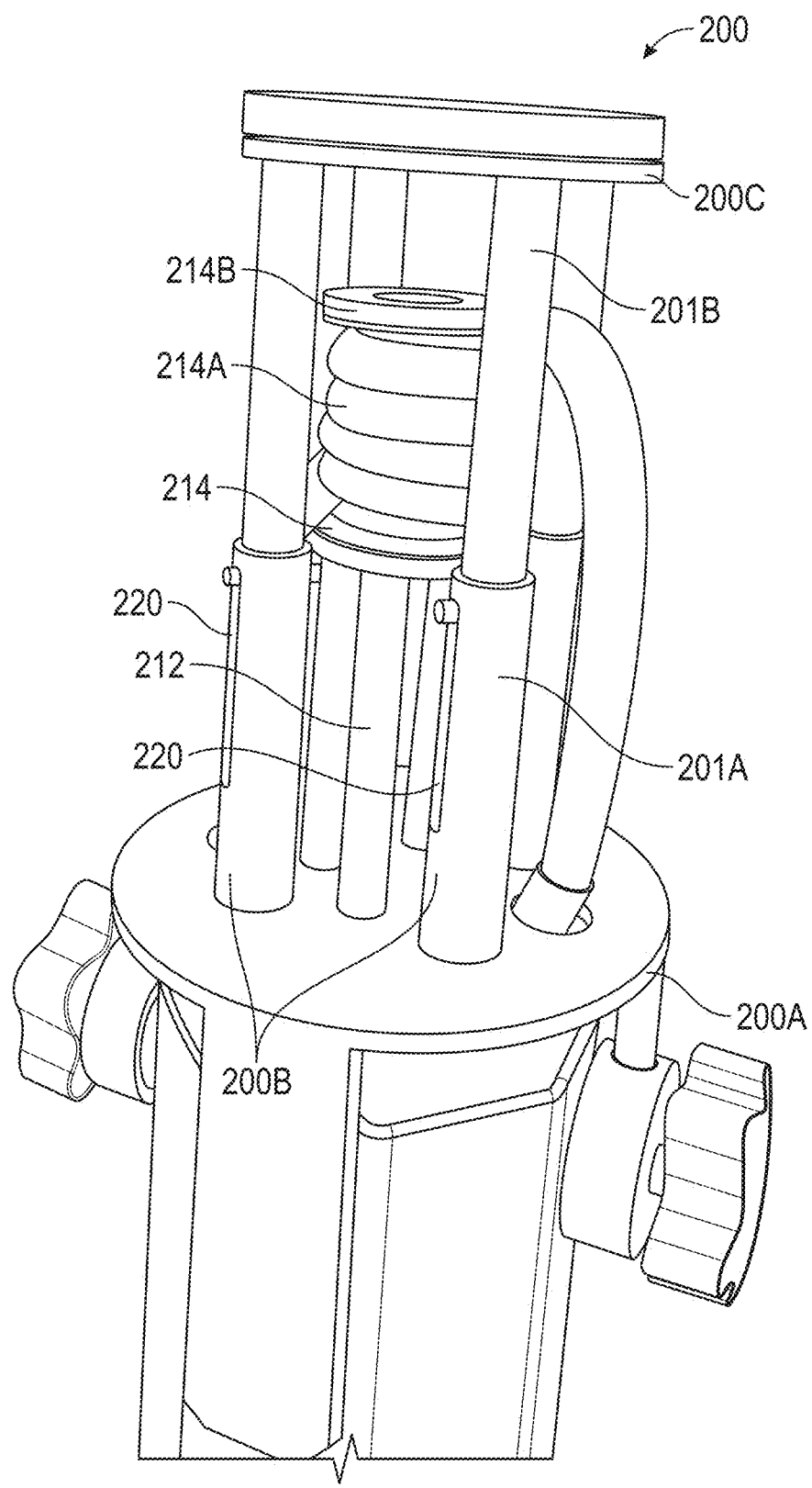
FIG. 3 is an elevational view of an insert induction remover device showing the plurality of shafts of the insert induction remover device in an extended position, according to an embodiment of the present disclosure.

FIG. 3 is a perspective view of the insert induction remover device 200 showing the plurality of shafts 200B in the extended position, according to an embodiment of the present disclosure. As shown in FIG. 2A and FIG. 3, the insert induction remover device 200 includes a base 200A and a plurality of shafts 200B extending from the base 200A. For example, as shown in FIG. 2A and FIG. 3, the insert induction remover device 200 includes four shafts 200B. However, any number of shafts 200B (e.g., two, three, or more) can be used. As shown in FIG. 3, the plurality of shafts 200B are telescoping shafts such that a first shaft portion 201A of a shaft in the plurality of shafts 200B is fixedly attached to the base 200A while a second shaft portion 201B of the shaft in the plurality of shafts 200B is slidable relative to the first shaft portion 201A of the shaft in the plurality of shafts 200B. The first shaft portion 201A has a hollow cavity 215 and the second shaft portion 201B is configured to slide within the hollow cavity 215. A biasing member 220, such as, but not limited to, a spring, is disposed between the first shaft portion 201A and the second shaft portion 201B. In an embodiment, the biasing member 220 is disposed inside the hollow cavity 215 of the first shaft portion 201A. The biasing member 220 is configured to bias the second shaft portion 201B of the shaft in the plurality of shafts 200B to an extended position relative to the first shaft portion 201A of the shaft in the plurality of shafts 200B. The biasing member 220 (e.g., a spring) is also configured to be compressed to bring the second shaft portion 201B of the shaft in the plurality of shafts 200B to a compressed position relative to the first shaft portion 201A of the shaft in the plurality of shafts 200B. In an embodiment, the biasing member 220 is selected according to a type of the laminate structure 206, a type of the insert 202, or a type of the adhesive material used to bond the insert 202 and the laminate structure 206, or any combination thereof.

The insert induction remover device 200 further includes a platform 200C mounted to an end of each of the plurality of shafts 200B. The platform 200C is mounted to an end of the second shaft portion 201B of each of the plurality of shafts 200B. The platform 200C can have a shape of a disc, for example. As shown in FIG. 2A, the platform 200C has an opening 210 large enough to enable the insert and attaching features to pass through once the adhesive bond is broken.

As shown in FIG. 2A and FIG. 3, the insert induction remover device 200 also includes one or more supporting rods 212. The one or more supporting rods 212 are disposed radially inward relative to the plurality of shafts 200B. The insert induction remover device 200 also includes an inductor 214 configured to generate a magnetic field that can generate heat in certain metals via induction. The inductor 214 is mounted to the one or more supporting rods 212. The inductor 214 includes a coil of conducting wire 214A coiled around a magnetic susceptible core 214B (e.g., iron). When a current flows through the conducting wire 214A, the inductor 214 is configured to generate a magnetic field within the magnetic susceptible core 214B. When the plurality of shafts 200B are in the compressed position, the inductor 214 is brought closer towards the opening 210 within the platform 200C of the insert induction remover device 200. In an embodiment, the inductor 214 is configured to apply heat to the insert 202 for a predetermined time period based on a type of the laminate structure 206, a type of the insert 202, or a type of the adhesive material used to bond the insert 202 and the laminate structure 206, or any combination thereof.

In operation, in order to extract the insert 202, that is adhesively bonded to the substrate 204, from the substrate 204 or the laminate structure 206, the insert 202 is heated with the insert induction remover device 200. In order to apply heat to the insert 202, the insert induction remover device 200 is brought closer to the insert 202 such that the platform 200C that is mounted to an end of each of the plurality of shafts 200B abuts against the insert 202. The magnetic susceptible core 214B is mechanically linked (e.g., fastened or bolted) to the insert 202 such that a removing (e.g., pulling) load is applied to the insert 202. The magnetic susceptible core 214B is thus in contact with the insert 202. The opening 210 of the platform 200C is centered about the insert 202. A force is exerted by the insert induction remover device 200 to compress the biasing member 220 between the second shaft portion 201B of the shaft in the plurality of shafts 200B and the first shaft portion 201A of the shaft in the plurality of shafts 200B to bring the plurality of shafts 200B in the compressed position and, thus, bring the inductor 214 closer towards the opening 210 within the platform 200C of the insert induction remover device 200 so that the inductor 214 abuts the insert 202 and comes in thermal contact with the insert 202. An electrical current is supplied to the inductor 214 of the insert induction remover device 200 to deliver electrical current to the coil of conducting wire 214A in the inductor 214 to generate a magnetic field to heat up the bushing 202A (e.g., metal bushing) of the insert 202, for example, for a predetermined time period. The heat generated by the inductor 214 at least partially melts or softens the material (e.g., adhesive) of the end-core 206D around the insert 202 or softens the adhesive that is applied to the surface of the laminate 206B between the head of the insert 202 and the surface of the laminate 206B. The term "soften" is used herein to mean lowering a strength of the adhesive holding the insert 202 in, by application of thermal energy, to the point where the adhesive strength in the mode or modes of force application is lower than the strength of the substrate 204 the adhesive is bonded to. In an embodiment, the inductive heat can be applied directly to the insert 202. After softening or melting partially the adhesive between the insert 202 and the surface of the laminate 206B, the force is applied to break an adhesive bond between the insert 202 and the laminate 206B. In an embodiment, the force exerted by the insert induction remover device 200 can be a normal force, a torsional force, a shear force, or any combination thereof. In another embodiment, alternatively or additionally to the normal force, the torsional force, and/or the shear force, a vibrational force may further be applied to further lower heat that may be needed to break the adhesive bond.

After the predetermined time period of heating the insert 202 and softening the material (e.g., adhesive) of the end-core 206D or the adhesive between the insert 202 (e.g., the insert head) and the laminate 206B, the force that is exerted by the insert induction remover device 200 to bring the platform 200C against the laminate structure 206 is released. When the force is released, the plurality of shafts 200B are brought into the extended position and the inductor 214 retracts from the laminate structure 206. As a result, the inductor 214 removes (e.g., pulls) the insert 202 and, more specifically, removes (e.g., pulls) the bushing 202A of the insert 202 to extract the insert 202 from the laminate structure 206 without damaging the laminate structure 206.

The heat and the force applied by the insert induction remover device 200 to pull the insert 202 can be selected according to the material of the laminate 206B and the material of the insert 202 and the material (e.g., adhesive) of the end-core 206D around the insert 202 or the adhesive material between the inset 202 and the laminate 206B.

In an embodiment, the shape of the magnetic susceptible core 214B can be determined by the shape of the insert 202, the material of the insert, and the type of force that needs to be applied to the insert 202 for removal of the insert 202.

Figure 4:
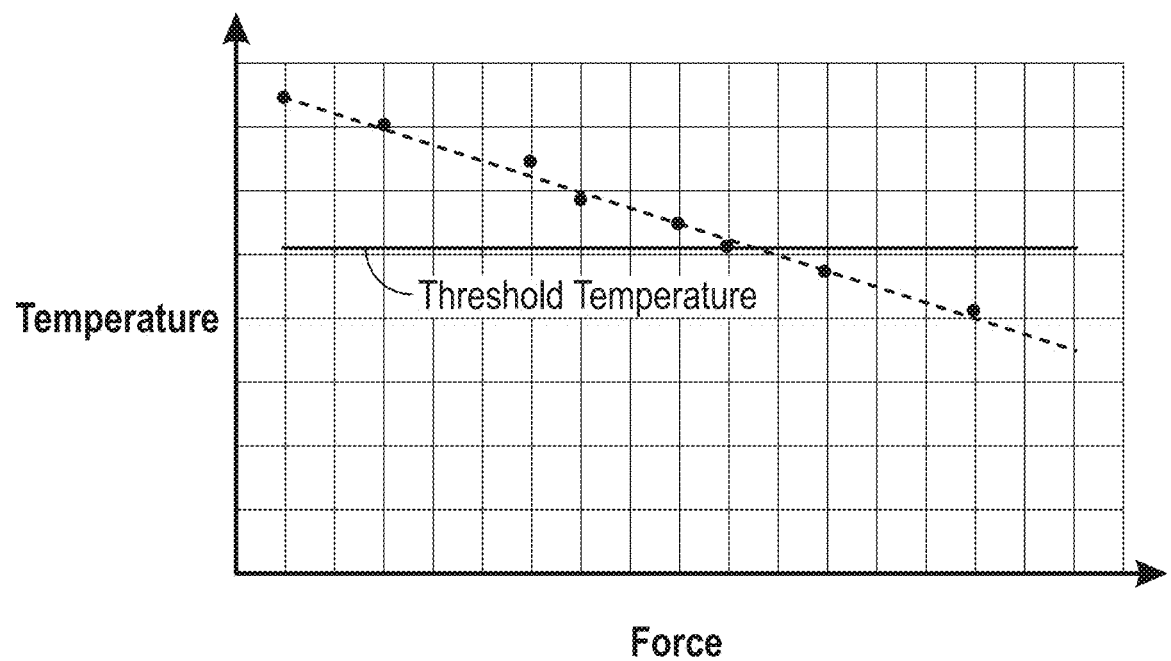
FIG. 4 is a plot of maximum temperature of the substrate from heat generated by an inductor of the insert induction remover device versus a force exerted by the insert induction remover device to compress a biasing member (e.g., a spring), according to an embodiment of the present disclosure.

FIG. 4 is a plot of a maximum temperature of the laminate 206B (FIG. 2A) near the insert 202 (FIG. 2A) from heat generated by the inductor 214 (FIG. 3) of the insert induction remover device 200 (FIG. 2A) versus a force exerted by the insert induction remover device 200 to compress the biasing member 220 (FIG. 2A) (e.g., a spring) between the second shaft portion 201B (FIG. 3) of the shaft in the plurality of shafts 200B (FIG. 2A) and the first shaft portion 201A (FIG. 3) of the shaft in the plurality of shafts 200B, according to an embodiment of the present disclosure. The dotted line in the plot shows a linear decrease of temperature needed with increasing force. The horizontal solid line indicates a threshold temperature (e.g., glass transition temperature, maximum operating temperature, etc.) above which damage to the laminate structure 206 (FIG. 2A) may occur. Therefore, it is desirable to operate the insert induction remover device 200 such that temperature of the laminate 206B remains under the threshold temperature (the horizontal solid line) corresponding to a safe operating temperature of the laminate structure 206. This shows that a user can apply a predetermined magnitude of mechanical force that ensures bushing removal (e.g., pulling) of the insert 202 below the threshold temperature corresponding to the safe operating temperature of the laminate structure 206 to avoid damaging the laminate structure 206. The magnitude of the force required to release the insert 202 prior to reaching threshold temperature (e.g., the glass transition temperature, maximum operating temperature, etc.) can be calculated and validated through trials.

Figure 5:
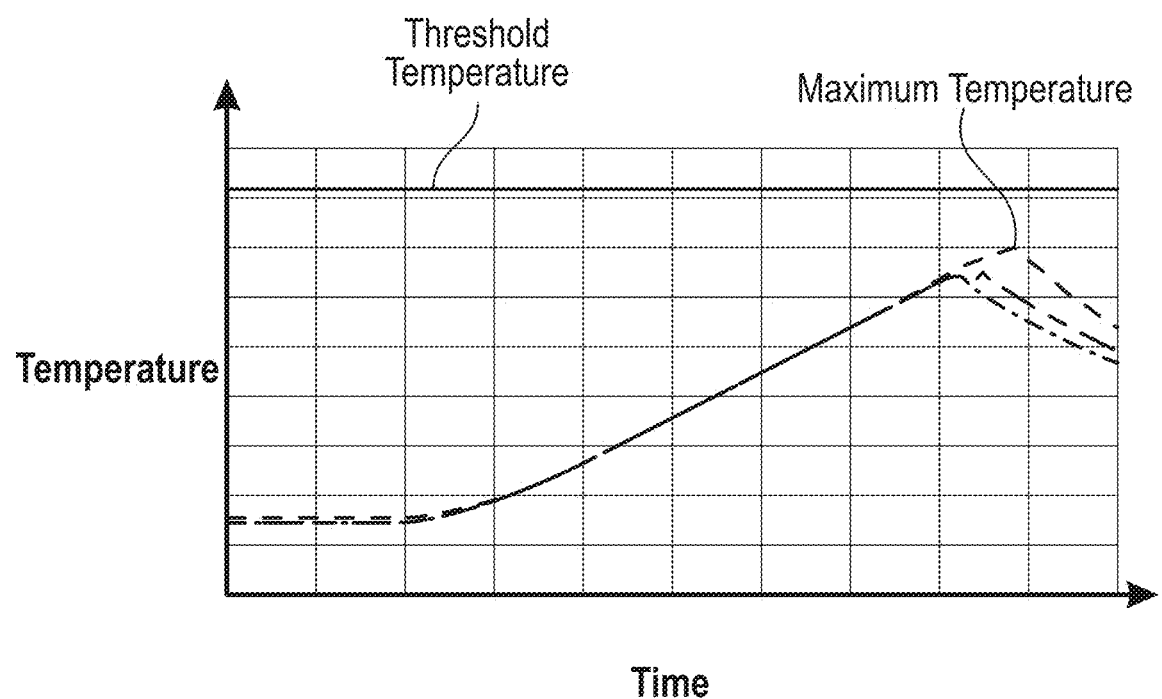
FIG. 5 is a plot of a temperature of the substrate from heat generated by the inductor of the insert induction remover device versus a time period of an application of the heat to the insert, according to an embodiment of the present disclosure.

FIG. 5 is a plot of a temperature of the insert 202 (FIG. 2A) from heat sensed at the surface of the laminate 206B (FIG. 2A) beneath the adhesive under insert 202 versus a time period of an application of the heat to the insert 202, according to an embodiment of the present disclosure. Each dotted line is the result of a separate trial overlaid on one another. The dotted lines show that the temperature of the laminate 206B increases versus time to reach a temperature where the bond holding the insert 202 breaks before decreasing rapidly after the bushing 202A (FIG. 2A) and thereby the heat source are removed. The horizontal solid line corresponds to the threshold temperature above which damage to the laminate structure 206 (FIG. 2A) may occur. These trials show that the embodiment described has very consistent results both in temperature profile and in maximum temperature required to remove the bushing 202A when the biasing member 220 (FIG. 2A) is constant.

Therefore, thermal exposure of the insert 202 and mechanical load to break an adhesive bond of the insert 202 can be controlled to prevent damaging or compromising structural integrity of the laminate structure 206.

In the above paragraphs, a process is described for removing the insert 202 from the laminate structure 206 using the insert induction remover device 200. A reverse process can also be used while controlling thermal exposure and mechanical load to a bond in a new insert 202 or to re-bond a repaired, damaged insert 202. In an embodiment, removing the insert with the insert induction remover device 200 includes pulling the insert 202, twisting the insert 202, vibrating the insert 202, or any combination thereof.

The insert induction remover device 200 can be provided with different biasing members (e.g., springs) having different spring constants, for example, to accommodate different laminate 206B materials as well as to adapt to various types of materials (e.g., adhesives) used to bond the insert 202 into the laminate structure 206, as illustrated in FIGS. 4 and 5.

Further aspects are provided by the subject matter of the following clauses.

An insert induction remover device for removing an insert from a substrate. The insert induction remover device includes (a) a base, a plurality of shafts extending from the base, each shaft of the plurality of shafts is a telescoping shaft including a first shaft portion fixedly attached to the base, a second shaft portion slidable relative to the first shaft portion, and a biasing member disposed between the first shaft portion and the second shaft portion, (b) a platform mounted to an end of each of the plurality of shafts, the platform having an opening therein, (c) one or more supporting rods disposed radially inward relative to the plurality of shafts, and (d) an inductor mounted to the one or more supporting rods. The biasing member is configured (i) to bias the second shaft portion to an extended position relative to the first shaft portion and (ii) to be compressed by applying a force to bring the second shaft portion to a compressed position relative to the first shaft portion to bring the inductor closer towards the opening within the platform to apply heat by magnetic induction to the insert in the substrate to melt at least partially adhesive material between the insert and the substrate to remove the insert from the substrate.

The insert induction remover device of the preceding clause, wherein the first shaft portion has a hollow cavity and the second shaft portion is configured to slide within the hollow cavity.

The insert induction remover device of any preceding clause, wherein the biasing member is disposed within the hollow cavity of the first shaft portion.

The insert induction remover device of any preceding clause, wherein the inductor comprises a coil of conducting wire coiled around a magnetic susceptible core, and the inductor is configured to generate a magnetic field when an electrical current flows through the coil of conducting wire.

The insert induction remover device of any preceding clause, wherein the biasing member is selected according to a type of the substrate, a type of the insert, or a type of the adhesive material between the insert and the substrate, or any combination thereof.

The insert induction remover device of any preceding clause, wherein the inductor is configured to apply heat to the insert for a predetermined time period based on a type of the substrate, a type of the insert, or a type of the adhesive material between the insert and the substrate, or any combination thereof.

A method of removing an insert from a substrate. The method includes heating the insert using induction, melting at least partially or softening an adhesive material between the insert and the substrate, applying a force to break an adhesive bond between the insert and the substrate, and removing the insert without damaging the substrate.

The method of the preceding clause further includes (a) applying a force against the substrate having the insert using an insert induction remover device so that an inductor of the insert induction remover device, (b) applying an electrical current to an inductor of the insert induction remover device to generate a magnetic field to heat up the insert for a predetermined time period, (c) softening at least partially an adhesive material between the insert and the substrate, (d) releasing the force applied against the substrate, and (e) removing the insert with the insert induction remover device without damaging the substrate.

The method of any preceding clause, wherein applying the force against the substrate comprises mechanically linking a magnetic susceptible core of the inductor to the insert so as to apply a pulling load on the insert.

The method of any preceding clause, wherein applying the force against the substrate having the insert using the insert induction remover device includes compressing a biasing member disposed between a first shaft portion and a second shaft portion slidable relative to the first shaft portion of each shaft in a plurality of shafts of the insert induction remover device to bring the plurality of shafts in a compressed position, wherein the biasing member is configured to bias the second shaft portion to an extended position relative to the first shaft portion.

The method of any preceding clause, wherein compressing the biasing member disposed between the first shaft portion and the second shaft portion includes compressing a spring disposed between the first shaft portion and the second shaft portion.

The method of any preceding clause, wherein compressing the biasing member disposed between the first shaft portion and the second shaft portion includes compressing the biasing member disposed within a hollow cavity of the first shaft portion.

The method of any preceding clause, wherein releasing the force applied against the substrate includes bringing the plurality of shafts into an extended position to retract the inductor from the substrate.

The method of any preceding clause, wherein applying the force against the substrate having the insert using the insert induction remover device includes bringing the inductor closer towards the insert to apply heat to the insert in the substrate to soften adhesive material between the insert and the substrate.

The method of any preceding clause, wherein applying the electrical current to the inductor to generate the magnetic field includes delivering the electrical current to a coil of a conducting wire of the inductor to generate the magnetic field to heat up the insert for the predetermined time period.

The method of any preceding clause, wherein the predetermined time period is selected based on a type of the adhesive material between the insert and the substrate.

The method of any preceding clause, wherein the insert includes a bushing and a plug mounted to an end of the bushing, and pulling the insert with the insert induction remover device comprises pulling the bushing of the insert.

The method of any preceding clause, wherein applying the electrical current to the inductor to generate the magnetic field to heat up the insert for the predetermined time period includes applying the electrical current such that a temperature of the insert is under a threshold temperature corresponding to a safe operating temperature of the substrate.

The method of any preceding clause, wherein applying the electrical current to the inductor to generate the magnetic field to heat up the insert for the predetermined time period includes applying the electrical current to the inductor to generate the magnetic field to heat up the insert for the predetermined time period based on a type of the substrate, a type of the insert, or a type of the adhesive material between the insert and the substrate, or any combination thereof.

The method of any preceding clause, wherein applying the force against the substrate having the insert using the insert induction remover device includes selecting a magnitude of the force that ensures removal of the insert without damaging the substrate.

The method of any preceding clause, wherein removing the insert with the insert induction remover device includes pulling the insert, pushing the insert, applying a sideways force to the insert, twisting the insert, vibrating the insert, or any combination thereof.

The method of any preceding clause, wherein applying the force comprises applying a normal force, applying a torsional force, applying a shear force, applying a vibrational force, or any combination thereof.

The method of any preceding clause, wherein the laminate structure is part of a fan casing or a casing of a low pressure compressor of a turbine engine.

The method of any preceding clause, wherein the laminate structure is part of an acoustically treated panel, part of a composite panel bolted on an aircraft or a spacecraft, or part of an automobile structure.

The method of any preceding clause, wherein the substrate includes a laminate structure.

The method of any preceding clause, wherein the laminate structure comprises a sandwich panel structure having a honeycomb core sandwiched between a plurality of laminates.

The method of any preceding clause, wherein the honeycomb core is made from a material including an aramid fiber reinforced phenolic resin, polyethylene (PE), polypropylene (PP), aluminum, carbon fiber, or fiber glass, or any combination thereof.

The method of any preceding clause, wherein the plurality of laminates are made from one or more layers of a material including carbon fiber reinforced epoxy, carbon fiber, fiber glass, polyimide, polyester, or any combination thereof.

The method of any preceding clause, wherein the substrate is part of a fan casing or a casing of a low pressure compressor of a turbine engine or part of an acoustically treated panel.

The method of any preceding clause, further including selecting the biasing member according to a type of the substrate, a type of the insert, or a type of the adhesive material between the insert and the substrate, or any combination thereof.

The method of any preceding clause, wherein selecting the biasing member comprises selecting springs with different spring constants depending upon the type of the substrate, the type of the insert, or the type of the adhesive material between the insert and the substrate, or any combination thereof.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A method of removing an insert from a substrate, the method comprising:
   mechanically linking a magnetic susceptible core of an inductor of an insert induction remover device to the insert so as to apply a pulling load on the insert;
   heating the insert using induction from the inductor;
   melting at least partially or softening an adhesive material between the insert and the substrate;
   applying a force to break an adhesive bond between the insert and the substrate; and
   removing the insert without damaging the substrate.

2. The method of claim 1, wherein the substrate comprises a laminate structure, and the laminate structure is part of a fan casing or a casing of a low pressure compressor of a turbine engine.

3. The method of claim 1, wherein the substrate comprises a laminate structure, and the laminate structure is part of an acoustically treated panel, part of a composite panel bolted on an aircraft or a spacecraft, or part of an automobile structure.

4. The method of claim 3, wherein the laminate structure comprises a sandwich panel structure having a honeycomb core sandwiched between a plurality of laminates.

5. The method of claim 4, wherein the honeycomb core is made from a material including an aramid fiber reinforced phenolic resin, polyethylene (PE), polypropylene (PP), aluminum, carbon fiber, or fiber glass, or any combination thereof.

6. The method of claim 4, wherein the plurality of laminates are made from one or more layers of a material including carbon fiber reinforced epoxy, carbon fiber, fiber glass, polyimide, polyester, or any combination thereof.

7. The method of claim 1, further comprising:
   positioning the inductor of the insert induction remover device to abut the insert,
   wherein heating the insert comprises applying an electrical current to the inductor of the insert induction remover device to generate a magnetic field to heat up the insert for a predetermined time period, and
   wherein applying the force comprises using the insert induction remover device to apply the force against the substrate to break the adhesive bond; and
   after breaking the adhesive bond, releasing the force applied against the substrate, wherein the insert induction remover device is used for removing the insert without damaging the substrate.

8. The method of claim 7, wherein applying the force against the substrate comprises applying the pulling load on the insert.

9. The method of claim 7, wherein applying the electrical current to the inductor comprises delivering the electrical current to a coil of a conducting wire of the inductor to generate the magnetic field to heat up the insert for the predetermined time period.

10. The method of claim 7, wherein the predetermined time period is selected based on a type of the substrate, a type of the insert, or a type of the adhesive material between the insert and the substrate, or any combination thereof.

11. The method of claim 7, wherein the insert comprises a bushing and a plug mounted to an end of the bushing, and removing the insert with the insert induction remover device comprises pulling the bushing of the insert.

12. The method of claim 7, wherein applying the electrical current to the inductor comprises applying the electrical current such that a temperature of the insert is under a threshold temperature corresponding to a safe operating temperature of the substrate.

13. The method of claim 7, wherein applying the electrical current to the inductor comprises applying the electrical current to the inductor to generate the magnetic field to heat up the insert for the predetermined time period based on a type of the substrate, a type of the insert, or a type of the adhesive material between the insert and the substrate, or any combination thereof.

14. The method of claim 7, wherein applying the force against the substrate comprises selecting a magnitude of the force that ensures removal of the insert without damaging the substrate.

15. The method of claim 7, wherein applying the force comprises applying a normal force, applying a torsional force, applying a shear force, applying a vibrational force, or any combination thereof.

16. The method of claim 7, wherein applying the force against the substrate comprises compressing a biasing member disposed between a first shaft portion and a second shaft portion slidable relative to the first shaft portion of each shaft in a plurality of shafts of the insert induction remover device to bring the plurality of shafts in a compressed position, wherein the biasing member is configured to bias the second shaft portion to an extended position relative to the first shaft portion.

17. The method of claim 16, wherein compressing the biasing member disposed between the first shaft portion and the second shaft portion comprises compressing a spring disposed between the first shaft portion and the second shaft portion.

18. The method of claim 16, wherein releasing the force applied against the substrate comprises bringing the plurality of shafts into an extended position to retract the inductor from the substrate.

19. The method of claim 16, further comprising selecting the biasing member according to a type of the substrate, a type of the insert, or a type of the adhesive material between the insert and the substrate, or any combination thereof.

20. The method of claim 19, wherein selecting the biasing member comprises selecting springs with different spring constants depending upon the type of the substrate, the type of the insert, or the type of the adhesive material between the insert and the substrate, or any combination thereof.

* * * * *